(12) United States Patent
Abbott et al.

(10) Patent No.: US 10,112,115 B2
(45) Date of Patent: Oct. 30, 2018

(54) GAMECASTING TECHNIQUES

(71) Applicant: NVIDIA CORPORATION, Santa Clara, CA (US)

(72) Inventors: Joshua Abbott, Raleigh, NC (US); James Van Welzen, Durham, NC (US); Jonathan White, Fort Collins, CO (US); David Clark, Durham, NC (US); Nidhi Singh, Bellevue, WA (US); Cristobal Alvarez-Russell, Durham, NC (US)

(73) Assignee: NVIDIA CORPORATION, Santa Clara, CA (US)

( * ) Notice: Subject to any disclaimer, the term of this patent is extended or adjusted under 35 U.S.C. 154(b) by 518 days.

(21) Appl. No.: 14/526,196

(22) Filed: Oct. 28, 2014

(65) Prior Publication Data
US 2015/0119142 A1 Apr. 30, 2015

Related U.S. Application Data

(60) Provisional application No. 61/896,531, filed on Oct. 28, 2013.

(51) Int. Cl.
| | | |
|---|---|---|
| *A63F 13/86* | (2014.01) | |
| *G02B 27/01* | (2006.01) | |
| *A63F 13/358* | (2014.01) | |

(52) U.S. Cl.
CPC .............. *A63F 13/86* (2014.09); *G02B 27/01* (2013.01); *G02B 27/017* (2013.01); *A63F 13/358* (2014.09); *G02B 2027/014* (2013.01); *G02B 2027/0138* (2013.01)

(58) Field of Classification Search
CPC ........ A63F 13/86; G02B 27/01; G02B 27/017
See application file for complete search history.

(56) References Cited

U.S. PATENT DOCUMENTS

| | | | | |
|---|---|---|---|---|
| 2011/0304713 | A1* | 12/2011 | Tardif | G06F 3/1423 348/54 |
| 2012/0210232 | A1* | 8/2012 | Wang | G11B 27/034 715/723 |
| 2013/0047189 | A1* | 2/2013 | Raveendran | H04N 21/23 725/81 |
| 2014/0002730 | A1* | 1/2014 | Thomson | G06F 1/3265 348/441 |
| 2014/0366057 | A1* | 12/2014 | Brockmann | H04N 21/482 725/37 |
| 2015/0121437 | A1* | 4/2015 | Tan | H04N 21/2187 725/93 |
| 2016/0250556 | A1* | 9/2016 | Nomura | A63F 13/34 463/29 |
| 2017/0072324 | A1* | 3/2017 | Navok | A63F 13/86 |
| 2017/0243617 | A1* | 8/2017 | Lee | G06K 9/00758 |

* cited by examiner

*Primary Examiner* — Corbett B Coburn
(74) *Attorney, Agent, or Firm* — Artegis Law Group, LLP

(57) ABSTRACT

One embodiment of the present invention sets forth a technique for broadcasting composited game content. The technique includes executing an application program to generate a first video frame of game content, and causing the first video frame to be displayed on a primary display device. The technique further includes compositing at least one graphical user interface (GUI) element with the first video frame to generate a composited frame. The technique further includes causing the composited frame to be displayed on an external display device by transmitting the composited frame to the external display device via a local display interface.

17 Claims, 17 Drawing Sheets

Spectator Mode

Spectator Mode

Selective GUI Elements

Selective GUI Elements

Selective GUI Elements

Load Balancing

Load Balancing

Instant Replay

Instant Replay

GAMECASTING TECHNIQUES

CROSS-REFERENCE TO RELATED APPLICATIONS

This application claims benefit of the U.S. provisional patent application having Ser. No. 61/896,531, filed Oct. 28, 2013. The subject matter of this related application is hereby incorporated herein by reference.

BACKGROUND OF THE INVENTION

Field of the Invention

Embodiments of the present invention relate generally to computer graphics and, more specifically, to various gamecasting techniques.

Description of the Related Art

Gamecasting is an activity in which a user of a software application (e.g., a video game application) broadcasts a live stream of his or her interactions with the software application. The broadcast is typically transmitted via the Internet, enabling others to receive a live audio/video stream of the user's activities via a direct connection and/or via a web service, such as Twitch™ or Youtube™.

Generally, when gamecasting, the user transmits a live stream of his or her view of the software application. Additionally, the user may commentate on his or her gameplay via a microphone, webcam, and/or a textual messaging platform and transmit this additional audio/video content to a web service. Viewers that connect to the web service to view the gamecast may then be presented with a live view of the user's gameplay as well as a live video stream of the user and/or a messaging window that allows the viewers to interact with the user and/or other viewers.

Although conventional gamecasting platforms generally provide a high level of interactivity (e.g., via live video feeds and messaging platforms), such services suffer from a number of drawbacks. For example, one drawback of conventional gamecasting services is that the video feed they are viewing generally has a relatively high degree of latency (e.g., about 1 to 10 seconds). Although this degree of latency is inconsequential in the context of other types of live streams (e.g., movies viewed via Internet video services, audio broadcast, etc.), in gaming applications, this degree of latency can significantly detract from the gaming experience and/or a viewer's ability to obtain relevant information from a gamecast.

Another limitation of conventional gamecasting platforms is that the video stream outputted to users is oftentimes cluttered with a high amount of extraneous information. For example, a gamecast stream viewed via a web portal may include a user's view of the video game application, a number of graphical user interface elements, one or more live webcam feeds, a chat windows, etc. Consequently, viewers of the gamecast may have a difficult time viewing the gamecast, particularly on smaller mobile devices. Additionally, if the user that is transmitting the gamecast is operating the software application on a mobile device, such as a smartphone, tablet, or handheld gaming device, he or she also may have difficulty navigating a cluttered interface to monitor the gamecast, adjust the gamecast, and/or interact with viewers of the gamecast.

As the foregoing illustrates, what is needed in the art are more effective techniques for gamecasting.

SUMMARY OF THE INVENTION

One embodiment sets forth a method for broadcasting composited game content. The method includes executing an application program to generate a first video frame of game content, and causing the first video frame to be displayed on a primary display device. The method further includes compositing at least one graphical user interface (GUI) element with the first video frame to generate a composited frame. The method further includes causing the composited frame to be displayed on an external display device by transmitting the composited frame to the external display device via a local display interface.

Further embodiments provide, among other things, a system and a non-transitory computer-readable medium configured to carry out method steps set forth above.

One advantage of the disclosed techniques is that they enable a user to view a low-latency version of a gamecast on a local display device. Another advantage of the disclosed techniques is that a user is able to adjust which graphical user interface elements are outputted to a local display, an external display, and/or a remote server during gamecasting. The disclosed techniques further enable the rate(s) at which frames are transmitted to a local display, an external display, and/or a remote server to be monitored and dynamically adjusted during gamecasting. Additionally, the disclosed techniques enable a user to easily initiate a replay of content during gamecasting.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
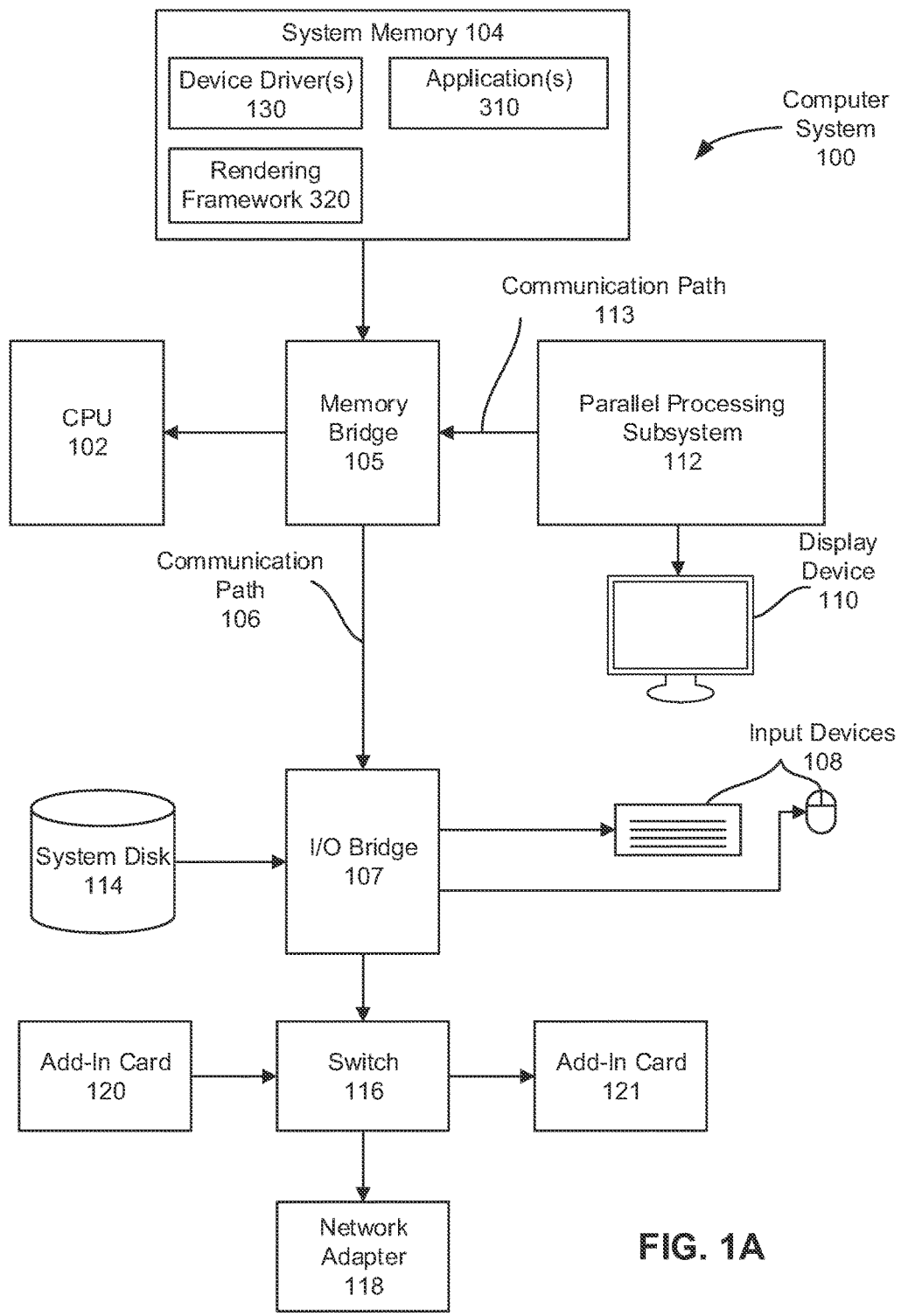
FIG. 1A is a block diagram illustrating a computer system configured to implement one or more aspects of the present invention.
Figure 1B:
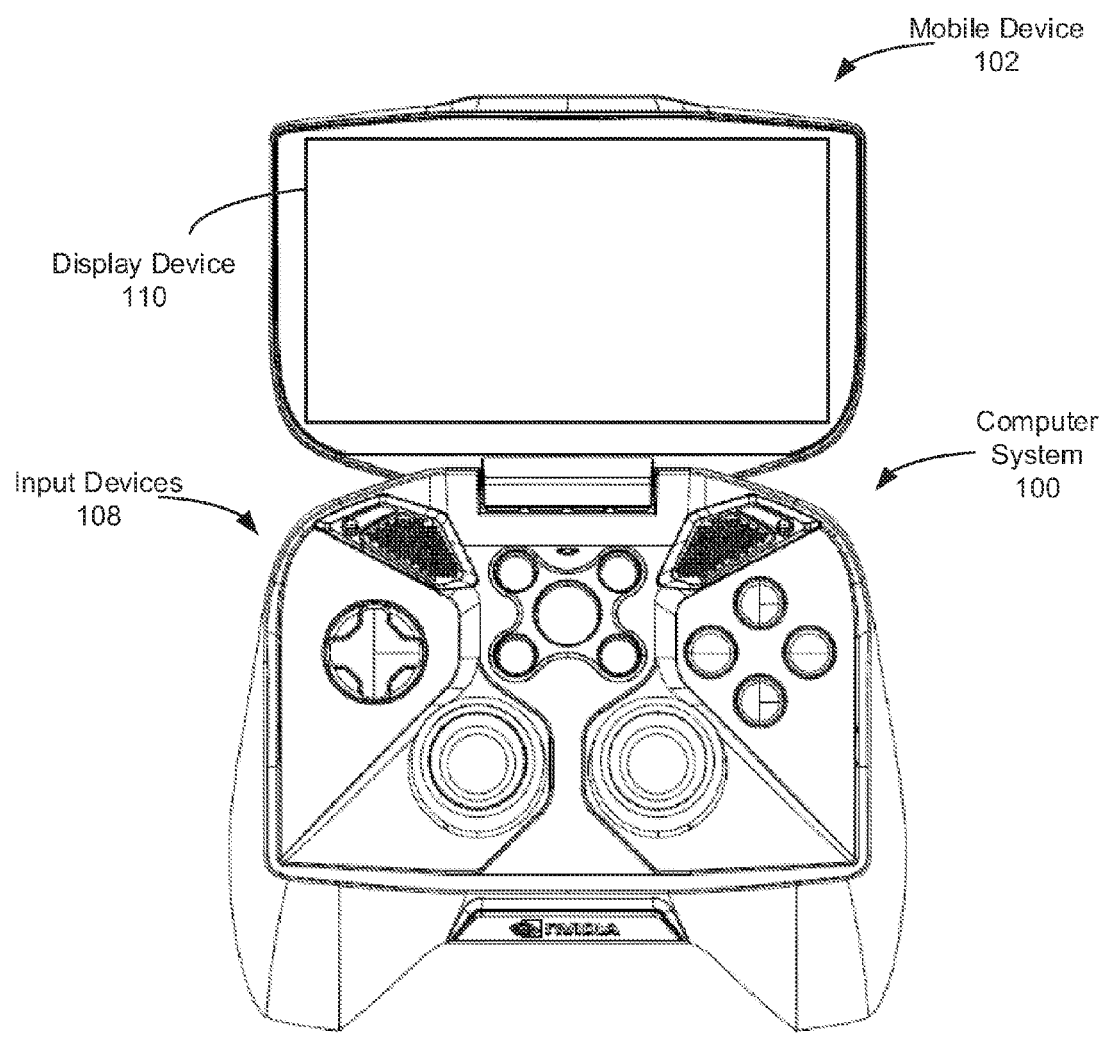
FIG. 1B is a schematic diagram illustrating a mobile device that is, according to one embodiment of the present invention, an implementation of the computer system of FIG. 1A.
Figure 2:
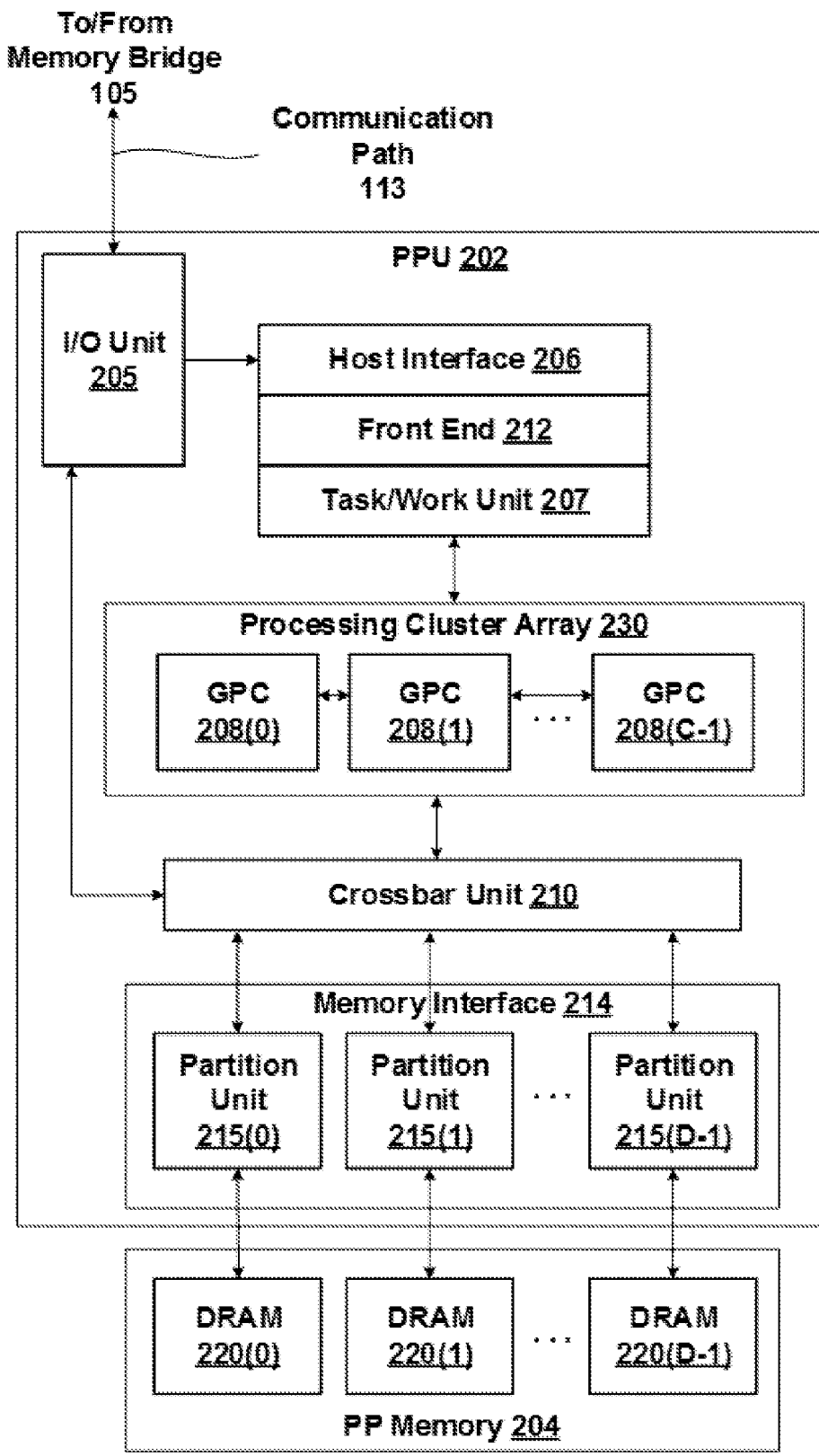
FIG. 2 is a block diagram of a parallel processing subsystem for the computer system of FIG. 1A, according to one embodiment of the present invention.

FIGS. 1A, 1B, and 2 depict an exemplary architecture and an exemplary mobile device within which embodiments of the present invention may be implemented. These figures in no way limit or are intended to limit the scope of the present invention. Persons skilled in the art would recognize that embodiments of the invention can be implemented in any computing environment, such as a central processing unit (CPU) or a graphics processing unit (GPU).

In the following description, numerous specific details are set forth to provide a more thorough understanding of the present invention. However, it will be apparent to one of skill in the art that the present invention may be practiced without one or more of these specific details.

System Overview

FIG. 1A is a block diagram illustrating a computer system 100 configured to implement one or more aspects of the present invention. As shown, the computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive information (e.g., user input information) from input devices 108, such as a keyboard, a mouse, a camera, and/or a microphone and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 130 configured to manage the input device 108 and/or the processing operations of the one or more PPUs within parallel processing subsystem 112. System memory 104 also includes an application 310, such as a video game application, media application, and/or communication application, and a rendering framework 320.

In various embodiments, parallel processing subsystem 112 may be integrated with one or more of the other elements of FIG. 1A to form a single system. For example, parallel processing subsystem 112 may be integrated with the, memory bridge 105, I/O bridge 107, display processor 111, and/or other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1A may not be present. For example, switch 116 could be eliminated, and network adapter 118 and add-in cards 120, 121 would connect directly to I/O bridge 107.

FIG. 1B is a schematic diagram illustrating a mobile device 102 that is, according to one embodiment of the present invention, an implementation of the computer system of FIG. 1A. As shown, the mobile device 102 includes, without limitation, a display device 110 and input device 108, such as joysticks, analog and/or digital control pads, camera(s), microphones, speakers, and the like. In various embodiments, the mobile device 102 executes one or more applications 310 to provide media functionality, such as mobile gaming, visual and/or auditory communication, video playback, and the like.

FIG. 2 is a block diagram of a parallel processing unit (PPU) 202 included in the parallel processing subsystem 112 of FIG. 1, according to one embodiment of the present invention. Although FIG. 2 depicts one PPU 202 having a particular architecture, as indicated above, parallel processing subsystem 112 may include any number of PPUs 202 having the same or different architecture. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1A or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1A, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where $D \geq 1$. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering and/or compression/decompression of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Gamecasting Techniques

Figure 3:
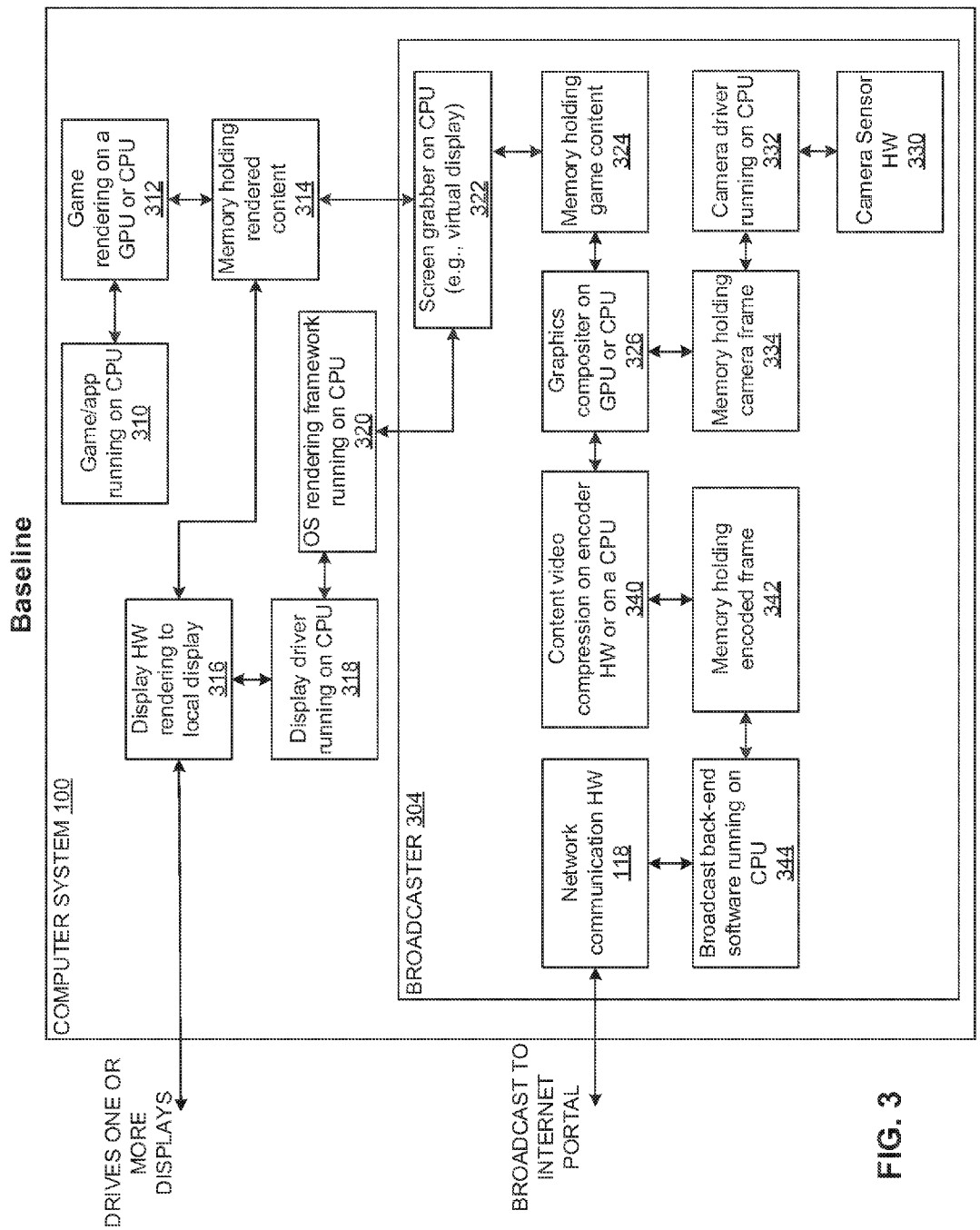
FIG. 3 illustrates a system for rendering a video frame and compositing and encoding the video frame for broadcast, according to one embodiment of the present invention.

FIG. 3 illustrates a system for rendering a video frame and compositing and encoding the video frame for broadcast, according to one embodiment of the present invention. Gamecasting is a process in which the user of a video game application broadcasts game content (e.g., real-time gameplay) to a remote server (e.g., a cloud computing server) via a local area network (LAN), the Internet, etc. to enable other users to view, discuss, and/or interact with the game content. In addition to broadcasting game content, a user may broadcast other materials associated with the video game application, such as graphical user interface (GUI) elements, statistics, chat windows, and media, such as an audio and/or video stream captured by a microphone or webcam. For example, a user may broadcast a live video feed to commentate about their gameplay. These materials may be composited or otherwise combined with the game content and transmitted to a remote server, such as a gamecasting service (e.g., Twitch™ or Youtube™).

As shown in FIG. 3, an application 310 is executed on CPU 102 and issues commands to the CPU 102 and/or the PPU 202 to render game content 312. The rendered content (e.g., rendered frames and/or audio content) is written to a memory 314 that is local to the CPU 102 and/or PPU 202. A rendering framework 320 executing on the CPU 102 manages windows and graphics associated with the operating system. The rendering framework 320 transmits display updates to the display driver 318. The display driver 318 transmits display commands to the display hardware 316 to render pixels on the display device 110, such as by accessing rendered content stored in memory 314.

Rendered content stored in memory 314 is further accessed by a virtual display device 322 (e.g., screen grabber) included in the broadcaster 304. The screen grabber 322 interacts with the rendering framework 320 and transmits rendered content to memory 324. A camera driver 332 receives images (e.g., camera frames of a user of the application) and/or audio from camera sensor hardware 330 and writes the video and/or audio to a memory 334. Memory 324 and memory 334 are accessed by a graphics compositer 326, which composites rendered content with camera frames and/or other GUI elements and transmits the composited frames to a video encoder 340. The video encoder 340 encodes the composited frames (e.g., using MPEG, H.264, high efficiency video coding (HEVC), or a similar encoding format) and writes the encoded frames to a memory 342. The encoded frames are then transmitted to a broadcast back-end 344, which interacts with network communication hardware 118 to transmit the encoded frames to the remote server (e.g., a gamecasting server).

A variety of gamecasting techniques are described below. Although, for purposes of clarity, each of the gamecasting techniques is described as being performed separately, in some embodiments, two or more of the gamecasting techniques may be combined in various embodiments.

Low-Latency Spectator Mode for Gamecasting

Figure 4A:
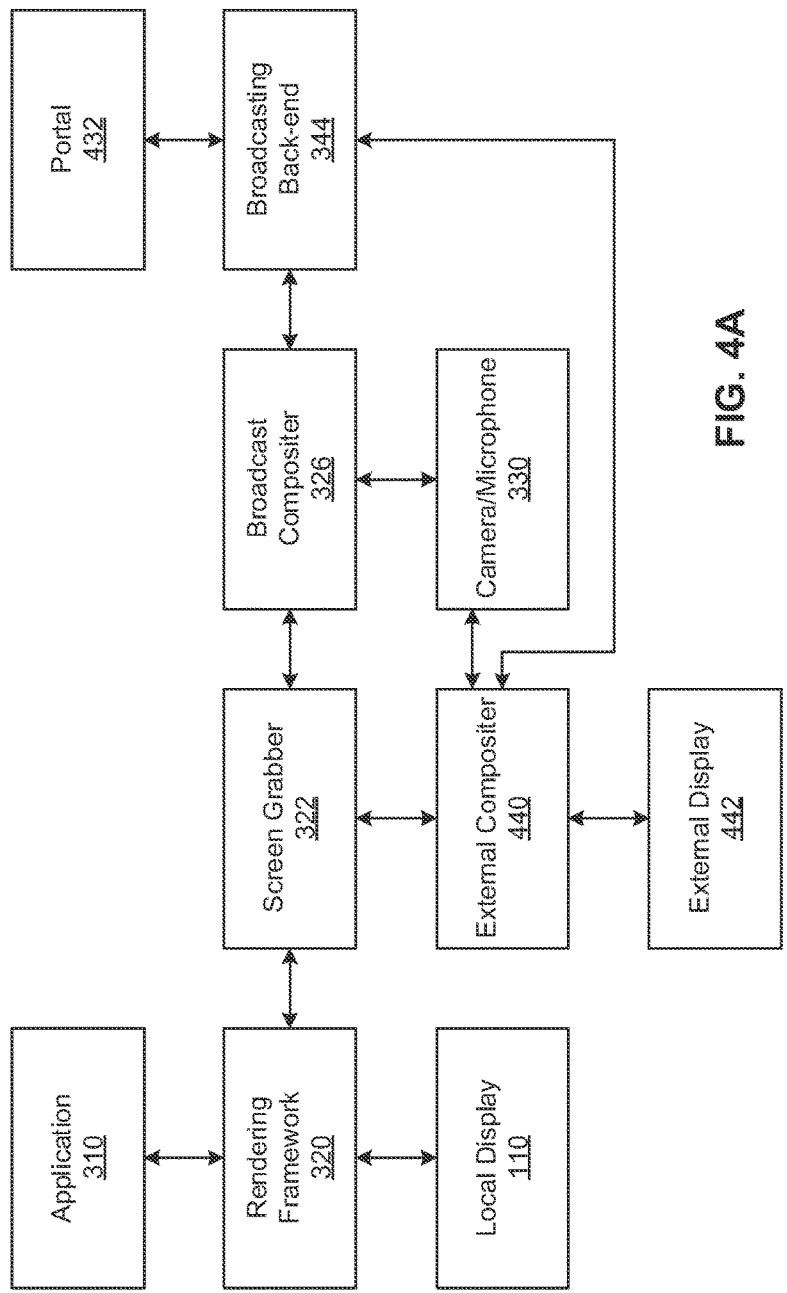
FIGS. 4A and 4B illustrate a system for displaying and broadcasting composited game content, according to one embodiment of the present invention.
Figure 4B:
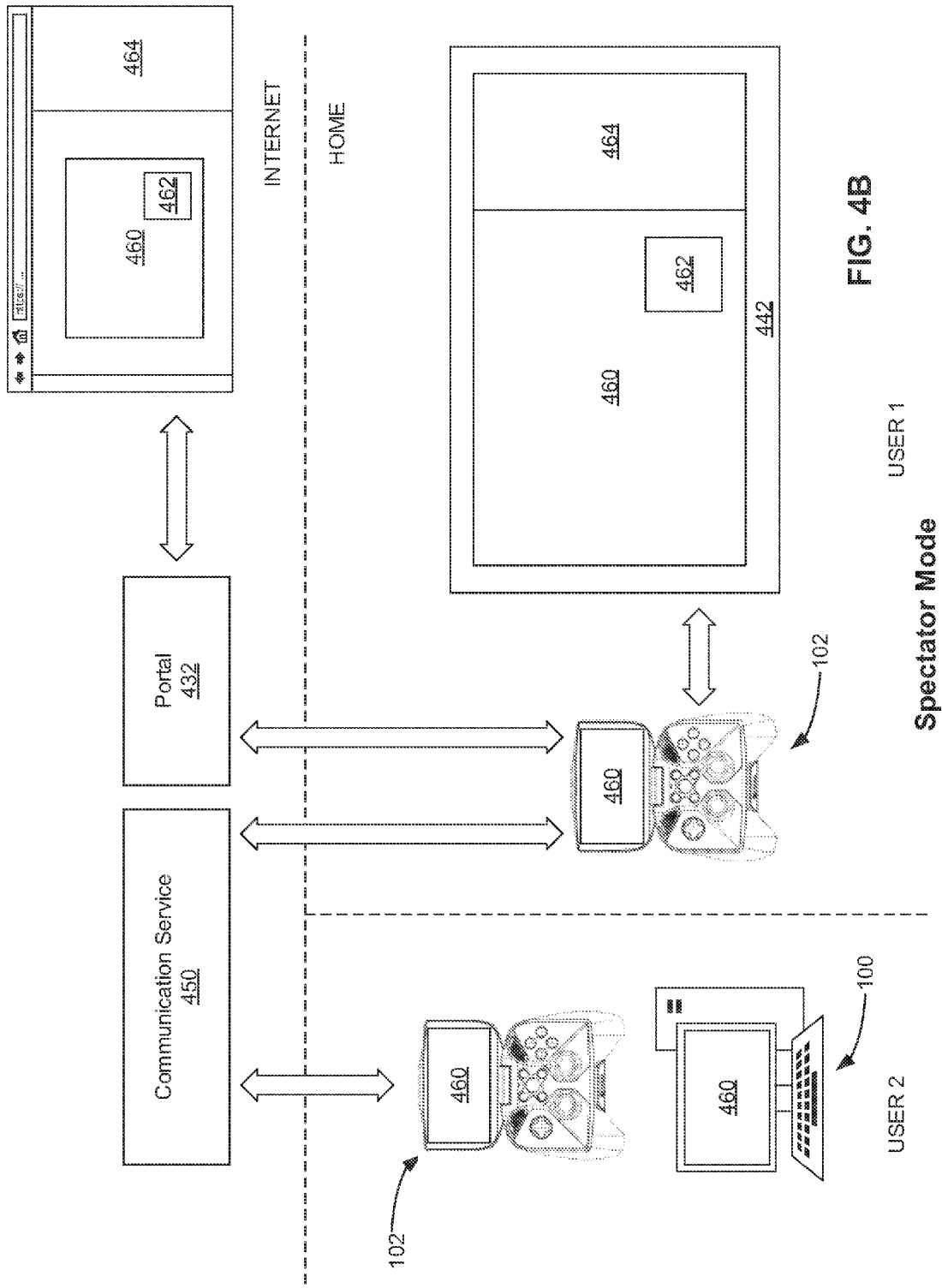

FIGS. 4A and 4B illustrate a system for displaying and broadcasting composited game content, according to one embodiment of the present invention. As described above, when a user is performing gamecasting, additional materials (e.g., statistics, chat windows, live video feed, etc.) may be composited with the game content and broadcast to a remote server. However, due to the lack of screen real-estate, it is difficult and/or impractical to display the additional materials on a mobile device 102. As such, in various embodiments, the game content may be displayed on the mobile device 102, and the additional materials may be composited with the game content and displayed on an external monitor.

Although compositing the game content and displaying the composited content on an external screen could be accomplished by uploading the game content to the Internet and using a different computer to display the resulting broadcast, the latency of the resulting broadcast would be increased by the round-trip time associated with transmitting game content to a server and receiving the composited game content from the server. Additionally, uploading the game content to a server would require the user to have a second computer system 100 to view the composited game content.

Figure 5:
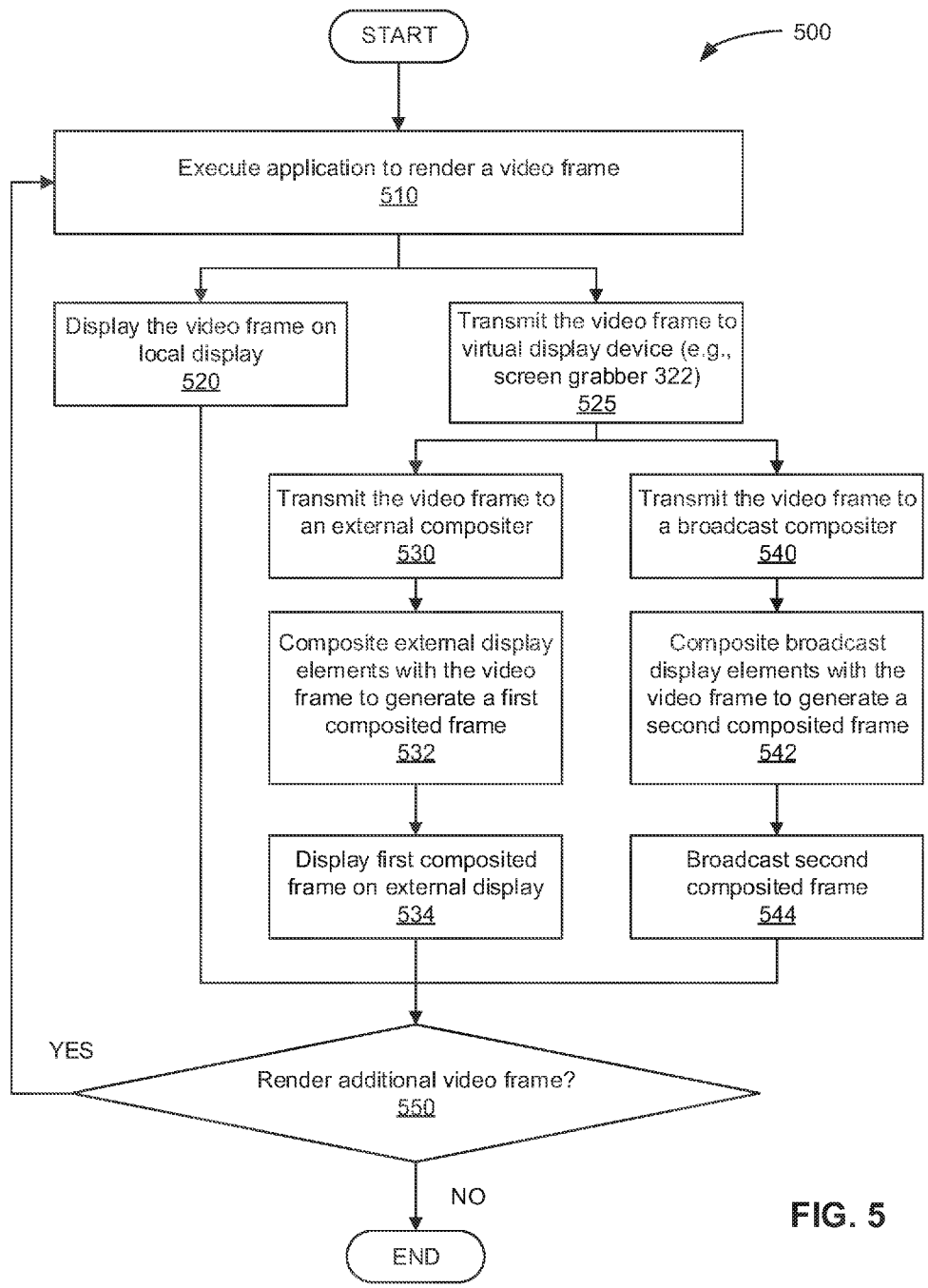
FIG. 5 is a flow diagram of method steps for displaying and broadcasting composited frames of game content, according to one embodiment of the present invention.

However, by implementing the techniques described in conjunction with FIGS. 4A-5, a single computer system 100 (e.g., mobile device 102) can be used to composite additional materials with the game content and display the composited game content on an external display, for example, via a local display interface. For example, in some embodiments, the local display interface may include a wired or wireless audio/video interface (e.g., HDMI, DisplayPort™, Miracast™, or LAN, etc.). Additionally, in some embodiments, the local display interface may connect the computer system 100 to an external display located in the same room and/or building as the user.

As shown in FIG. 4A, an application 310 issues commands to render video frames of game content via the rendering framework 320. The video frames are then outputted to the display device 110. Additionally, the video frames are accessed by screen grabber 322. The screen grabber 322 transmits the video frames to the broadcast compositer 326, which composites the video frames with camera frames (e.g., a live video feed of the user) and/or other GUI elements and transmits the composited frames to the broadcaster back-end 344. The broadcaster back-end 344 then transmits the composited frames to a portal 432 associated with a gamecasting server.

The screen grabber 322 further transmits the game content to a compositer 440 associated with an external display device 442. The external compositer 440 composites the game content with the camera frames and/or other GUI elements and transmits the composited frames to the external display device 442 (e.g., via HDMI, DisplayPort™, Miracast™, LAN, etc.).

The technique described above is further illustrated in FIG. 4B. As shown, the game content 460 is displayed on the mobile device 102, and the game content 460 is shown on the external display device 442 after being composited with a live video feed 462 and a chat window 464. In addition, the composited frames (e.g., including the game content 460, live video feed 462, and chat window 464) are broadcast to the portal 432, enabling the composited frames to be viewed on the Internet. Additionally, as shown, the mobile device 102 and/or computer system 100 may be connected to a communication service 450, enabling the user to communicate with other users via the live video feed 462, chat window 464, etc.

FIG. 5 is a flow diagram of method steps for displaying and broadcasting composited frames of game content 460, according to one embodiment of the present invention. Although the method steps are described in conjunction with the systems of FIGS. 1A-4B, persons skilled in the art will understand that any system configured to perform the method steps, in any order, falls within the scope of the present invention.

As shown, a method 500 begins at step 510, where the CPU 102 and/or PPU 202 execute an application 310 to render a video frame of game content 460. At step 520, the video frame is displayed on the local display device 110. At step 525, the video frame is transmitted to a virtual display device 322. At step 530, the virtual display device 322 transmits the video frame to an external compositer 440. At step 532, the external compositer 440 composites external display elements (e.g., statistics, chat windows, a live video feed, etc.) with the video frame to generate a first composited frame. At step 534, the external display device 442 displays the first composited frame.

At step 540, the virtual display device 322 transmits the video frame to the broadcast compositer 326. At step 542, the broadcast compositer 326 composites broadcast display elements (e.g., statistics, chat windows, a live video feed, etc.) with the video frame to generate a second composited frame. At step 544, the broadcaster back-end 344 broadcasts the second composited frame to a portal 432 via network communication hardware 118. At step 550, it is determined whether another video frame of game content 460 is to be rendered. If another video frame is to be rendered, then the method 500 returns to step 510. If no additional video frames are to be rendered, then the method 500 ends.

Selective Broadcasting of User Interface Elements for Gamecasting

Figure 6A:
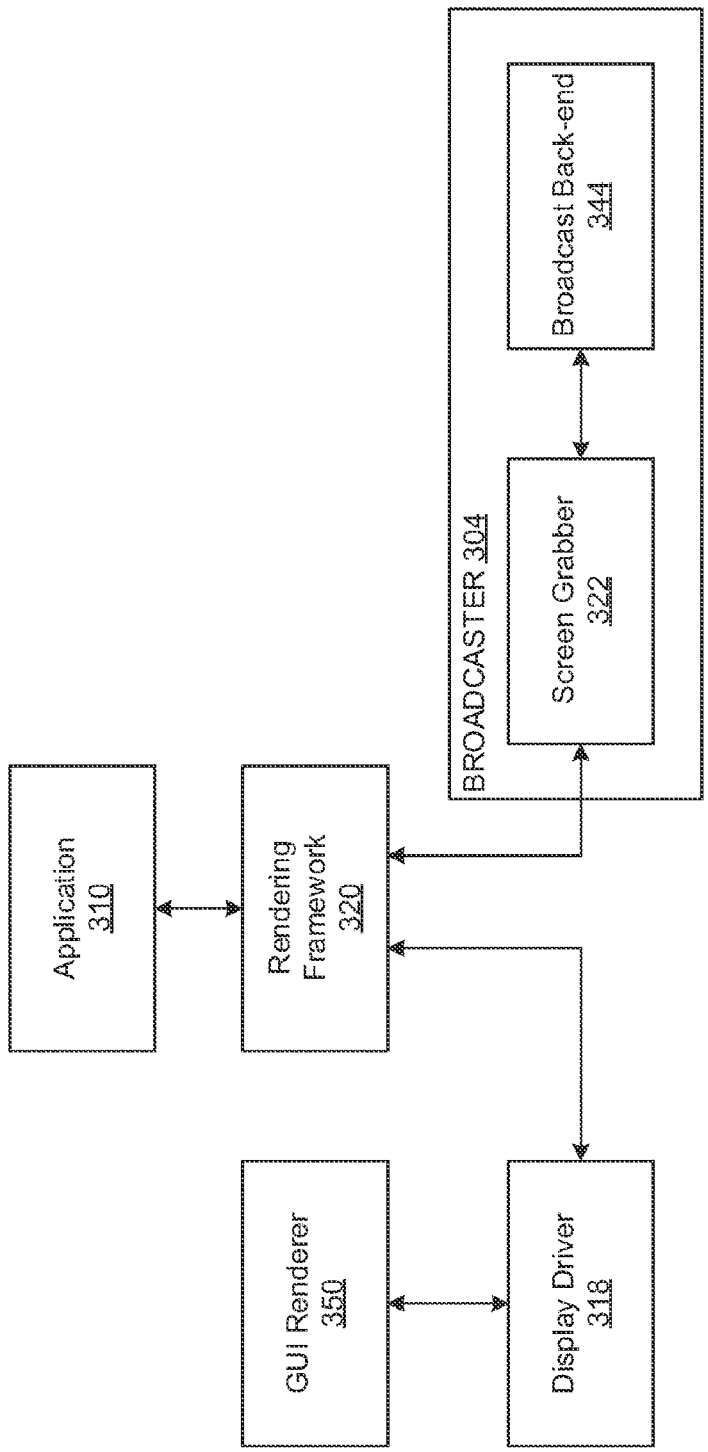
FIGS. 6A-6C illustrate a system for selectively compositing user interface elements with game content for broadcast, according to one embodiment of the present invention.
Figure 6B:
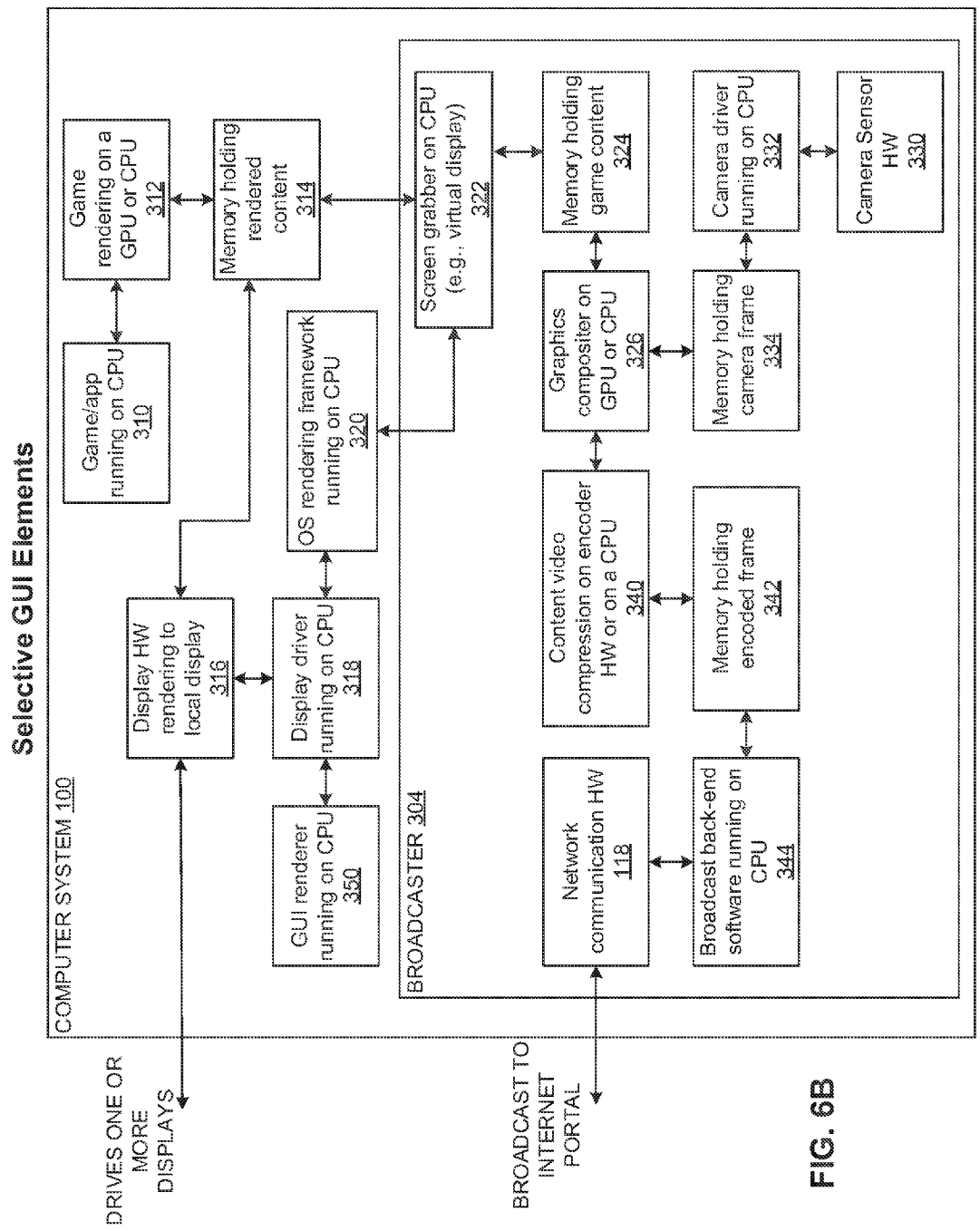
Figure 6C:
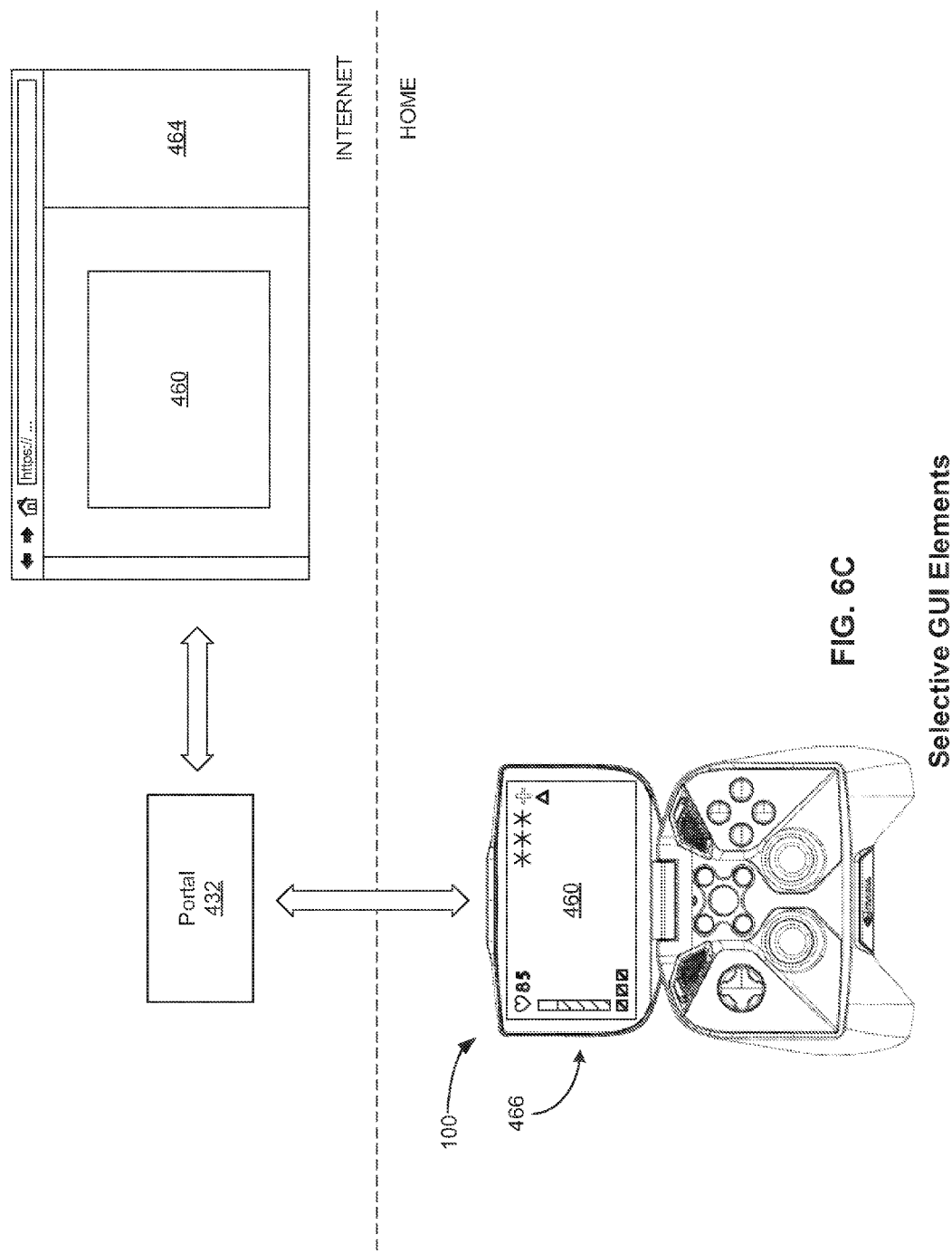

FIGS. 6A-6C illustrate a system for selectively compositing user interface elements with game content 460 for broadcast, according to one embodiment of the present invention. When a user is performing gamecasting, it may be undesirable to include GUI elements that may obscure or detract from the broadcast. For example, a user may wish to broadcast game content composited with specific materials, such as a live video feed, but without the heads-up display (HUD) related to the game, such as a player health, a number of bullets remaining, a time remaining, and other information provided to the user during gameplay. Accordingly, the GUI elements, such as the HUD, may be rendered separately and added to the game content after the game content has been captured for broadcast. As a result, the user will see the GUI elements, but the GUI elements will not be broadcast.

As shown in FIG. 6A, the GUI renderer 350 renders GUI elements 466 separately from the game content 460, which is rendered by the application 310 and rendering framework 320. For example, as shown in FIG. 6B, the GUI renderer 350 may be executed by the CPU 102 to transmit display commands associated with the GUI elements 466 to the display driver 318. As such, rendered frames of game content 460 can be captured by the screen grabber 322 and broadcast to the portal 432 prior to the GUI elements 466 being added to the rendered frames. Thus, layers and GUI elements 466 can be selectively added to the rendered frames of game content 460 that are to be broadcast to remote viewers.

Figure 7:
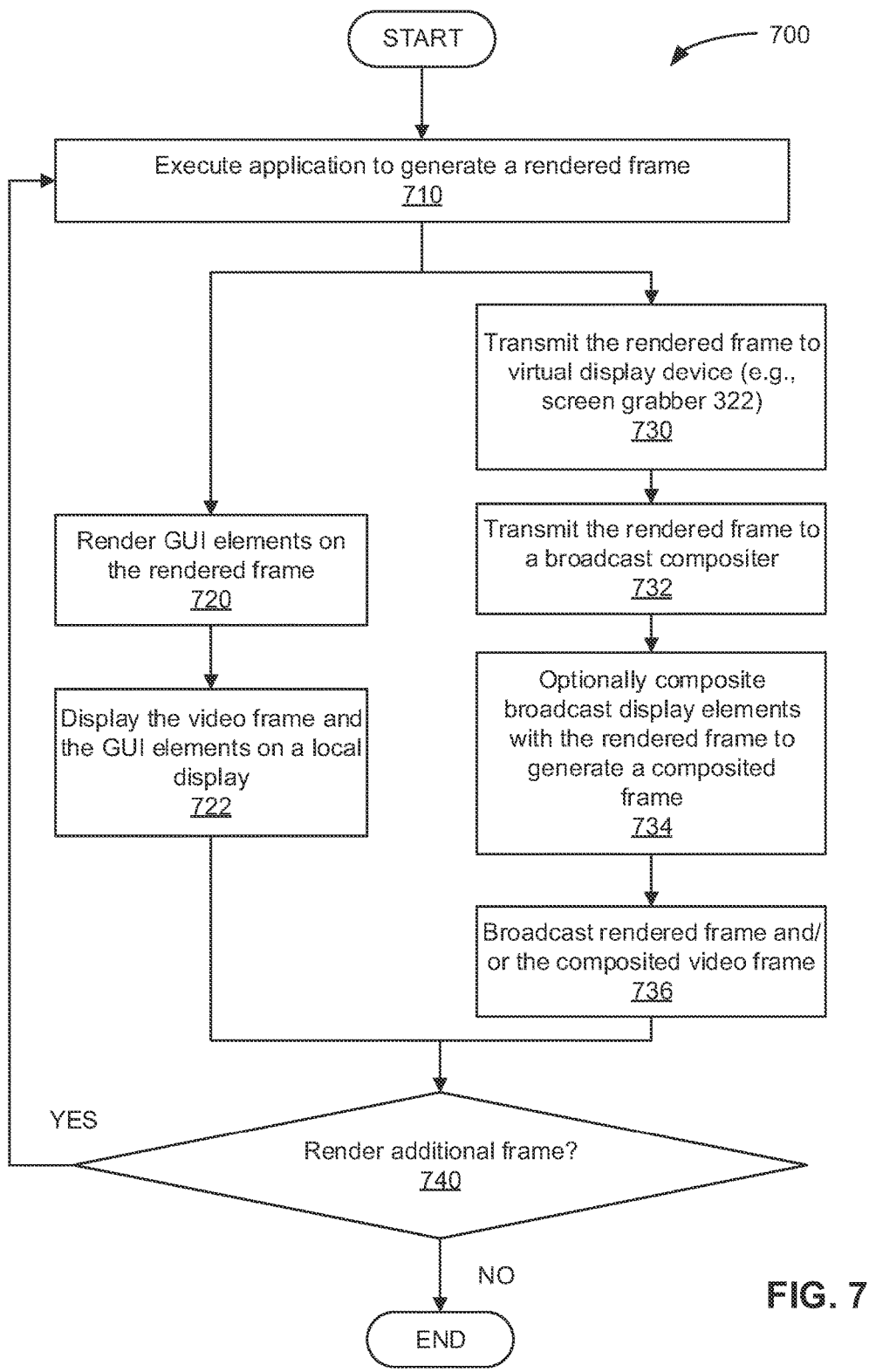
FIG. 7 is a flow diagram of method steps for selectively compositing user interface elements with game content for broadcast, according to one embodiment of the present invention.

FIG. 7 is a flow diagram of method steps for selectively compositing user interface elements with game content 460 for broadcast, according to one embodiment of the present invention. Although the method steps are described in conjunction with the systems of FIGS. 1A-3 and 6A-6C, persons skilled in the art will understand that any system configured to perform the method steps, in any order, falls within the scope of the present invention.

As shown, a method 700 begins at step 710, where the CPU 102 and/or PPU 202 execute an application 310 to render a frame of game content 460. At step 720, the GUI renderer 350 renders GUI elements 466 onto the rendered frame to generate a video frame for display by display device 110. At step 722, the display device 110 displays the video frame that includes the GUI elements 466.

At step 730, the CPU 102 and/or PPU 202 transmit the rendered frame (without GUI elements 466) to the virtual display device 322. At step 732, the rendered frame is optionally transmitted to the broadcast compositer 326, and, at step 734, broadcast display elements are optionally composited with the rendered frame to generate a composited frame. At step 736, the broadcast back-end 344 broadcasts the rendered frame and/or the composited frame to the portal 432. At step 740, it is determined whether another frame of game content 460 is to be rendered. If another frame of game content 460 is to be rendered, then the method 700 returns to step 710. If no additional frames are to be rendered, then the method 700 ends.

In various embodiments, the technique for selectively compositing user interface elements with game content 460 described above may be combined with any of the other techniques described herein. In some embodiments, the technique may be combined with the low-latency spectator mode described above, such that one or more GUI elements are selectively composited onto frames that are outputted to one or more of the local display device 110, the external display device 442, and/or a remote server. For example, GUI elements may be composited onto rendered frames of game content 460 that are outputted for display on the local display device 110 and/or the external display device 442, but not onto frames that are outputted to the remote server. In the same or other embodiments, the technique for selectively compositing user interface elements with game content 460 may be combined with other techniques, as described below.

System Load Balancing of Capture/Display for Gamecasting

Figure 8A:
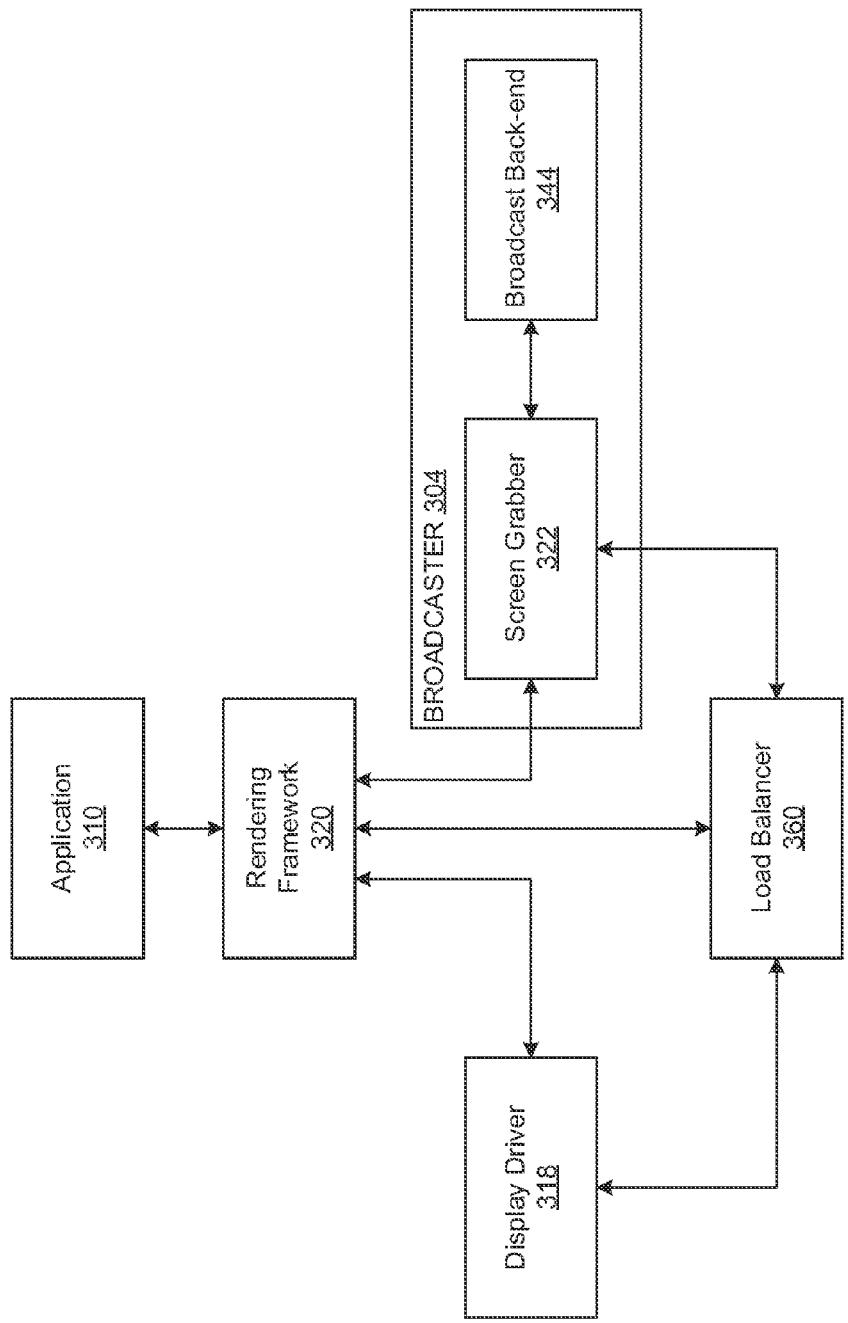
FIGS. 8A and 8B illustrate a system for load balancing the rate at which game content is displayed and the rate at which the game content is captured, according to one embodiment of the present invention.
Figure 8B:
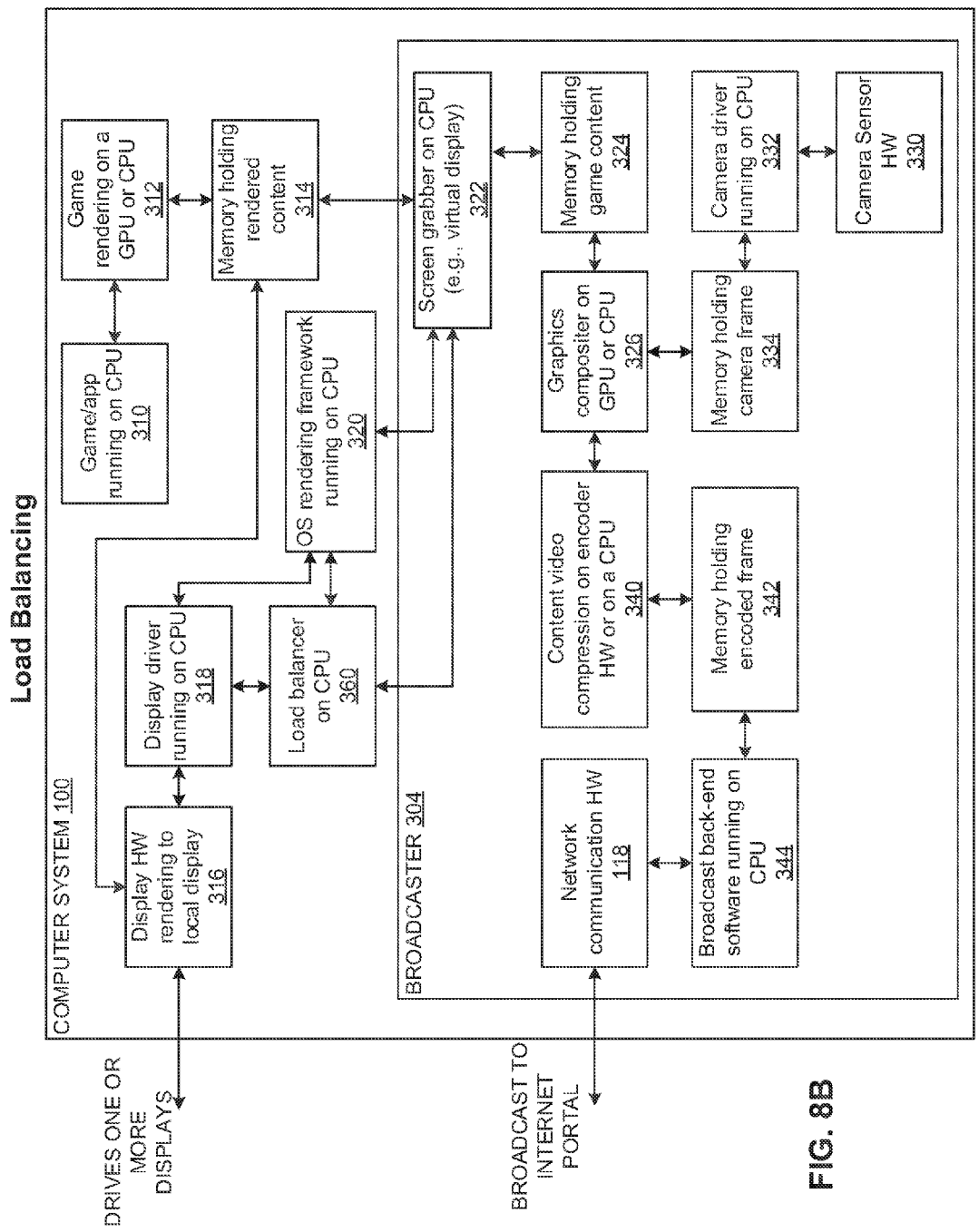

FIGS. 8A and 8B illustrate a system for load balancing the rate at which game content is displayed and the rate at which the game content is captured, according to one embodiment of the present invention. Capturing game content 460 for gamecasting (e.g., via an external display device and/or remote server) consumes system resources. As a result, capturing game content 460 for broadcast may reduce the rate at which the game content 460 can be rendered and displayed on the local display device 110. Accordingly, the technique for load balancing described below enables a computer system 100 to monitor the rendering rates associated with displaying game content 460 on the local device and, if the rendering rates drop below a threshold level, throttle the rate at which game content 460 is captured for broadcast.

As shown in FIG. 8A, the display driver 318 transmits a requested render rate to the rendering framework 320. The rendering framework 320 then renders game content to the display driver 318 at the requested render rate (or lower if overloaded). A load balancer 360 monitors the effective render rates of the display driver 318 and, depending on the effective render rates, instructs the screen grabber 322 to increase or decrease the rate at which game content 460 is captured. For example, if the effective render rate of the display driver 318 is below a threshold level (e.g., if the computer system 100 is overloaded), then the load balancer 360 may instruct the screen grabber 322 to decrease the rate at which game content 460 is captured. Additionally, if the effective render rate of the display driver 318 is at or above a threshold level (e.g., if the computer system 100 is underutilizing processing resources), then the load balancer 360 may instruct the screen grabber 322 to increase the rate at which game content 460 is captured. The screen grabber 322 may then request and/or receive game content 460 from the rendering framework 320 at the updated capture rate (or lower if overloaded). Consequently, the effective render rate of the display driver 318 may increase to a rate that is at or above the threshold level. Additionally, the load balancer 360 may transmit and receive effective render rates and updated rates associated with the display driver 318 and/or screen grabber 322 to and from the rendering framework 320.

Figure 9:
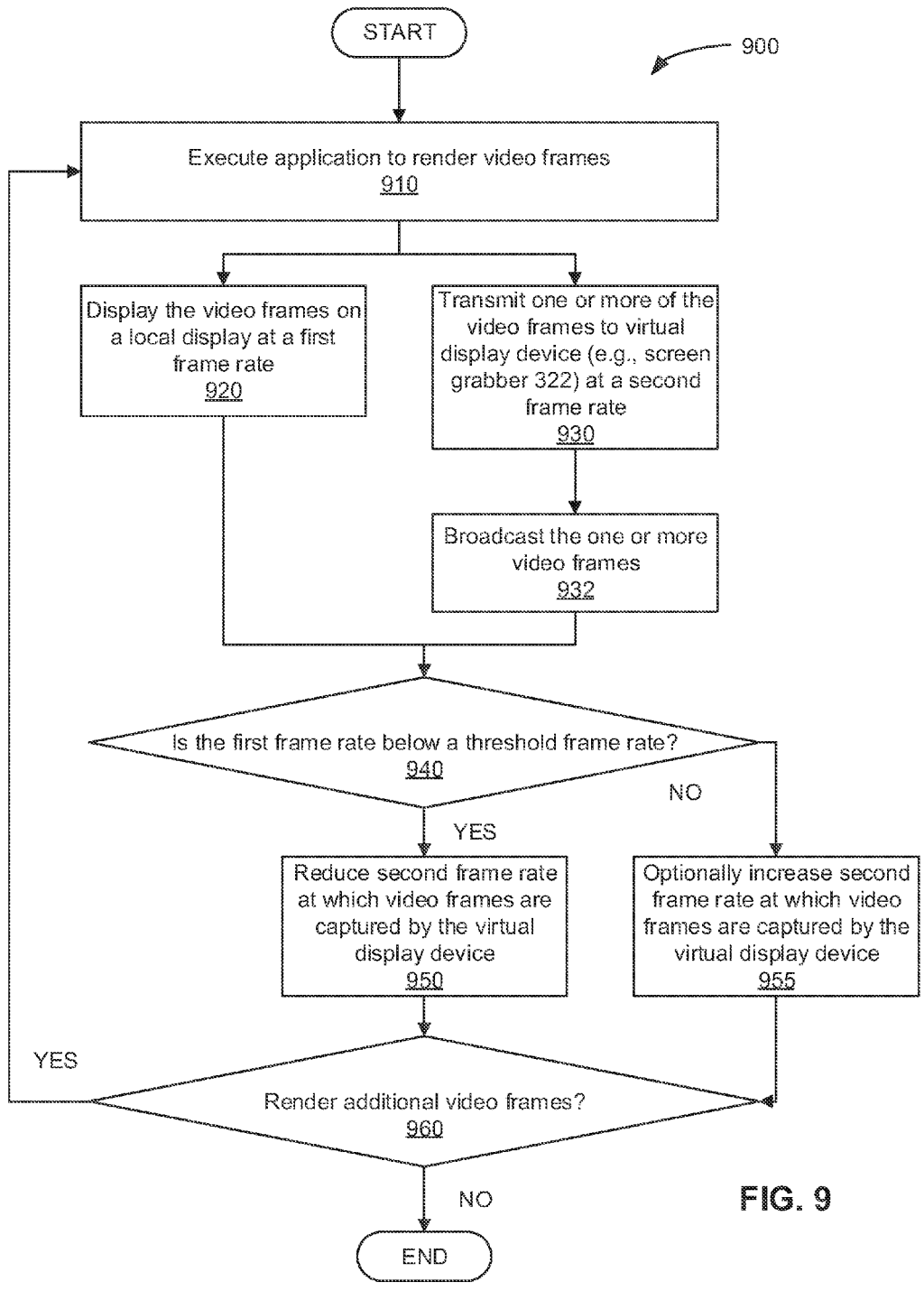
FIG. 9 is a flow diagram of method steps for load balancing the rate at which game content is displayed and the rate at which the game content is captured, according to one embodiment of the present invention.

FIG. 9 is a flow diagram of method steps for load balancing the rate at which game content 460 is displayed and the rate at which the game content 460 is captured, according to one embodiment of the present invention. Although the method steps are described in conjunction with the systems of FIGS. 1A-3, 8A and 8B, persons skilled in the art will understand that any system configured to perform the method steps, in any order, falls within the scope of the present invention.

As shown, a method 900 begins at step 910, where the CPU 102 and/or PPU 202 execute an application 310 to render video frames of game content 460. At step 920, the display driver 318 displays the video frames on a local display device 110 at a first frame rate. At step 930, the CPU 102 and/or PPU 202 transmit one or more of the video frames to the virtual display device 322 at a second frame rate. In some embodiments, video frames transmitted to the virtual display device 322 are subsequently transmitted to one or more compositers (e.g., an external compositer 440 and/or a broadcast compositer 326). At step 932, the broadcast back-end 344 broadcasts the one or more video frames.

At step 940, the load balancer 360 determines whether the first frame rate is below a threshold frame rate. If the first frame rate is below the threshold frame rate, then, at step 950, the load balancer 360 reduces the second frame rate at which video frames are captured. If the first frame rate is not below the threshold frame rate, then the method 900 proceeds to step 950, where the load balancer 360 optionally increases the second frame rate at which video frames are captured in order to more effectively utilize system resources. The method 900 then proceeds to step 960.

At step 960, the CPU 102 and/or PPU 202 determine whether additional video frames are to be rendered. If additional video frames are to be rendered, then the method 900 returns to step 910. If no additional video frames are to be rendered, then the method 900 ends.

In various embodiments, the load balancing technique described above may be combined with any of the other techniques described herein. In some embodiments, the technique may be combined with the low-latency spectator mode described above, such that the rates at which frames are outputted to the external display device 442, the local display device 110, and/or the remote server (e.g., portal 432) are adjusted based on system load. For example, if the frame rate at which game content is displayed on the local display device 100 drops below a threshold rate, then the rate(s) at which game content is captured for output to the external display device 442 and/or the remote server may be decreased. Further, in the same or other embodiments, the load balancing technique may be implemented in conjunction with the technique for selectively compositing user interface elements with game content and/or with the techniques described below. Thus, although the above embodiments discuss controlling the rate at which video frames are rendered based on a threshold rate, the techniques described above may be used for rendering any type of frame (e.g., composited frame, rendered frame, etc.).

Broadcasting a Replay for Gamecasting

Figure 10A:
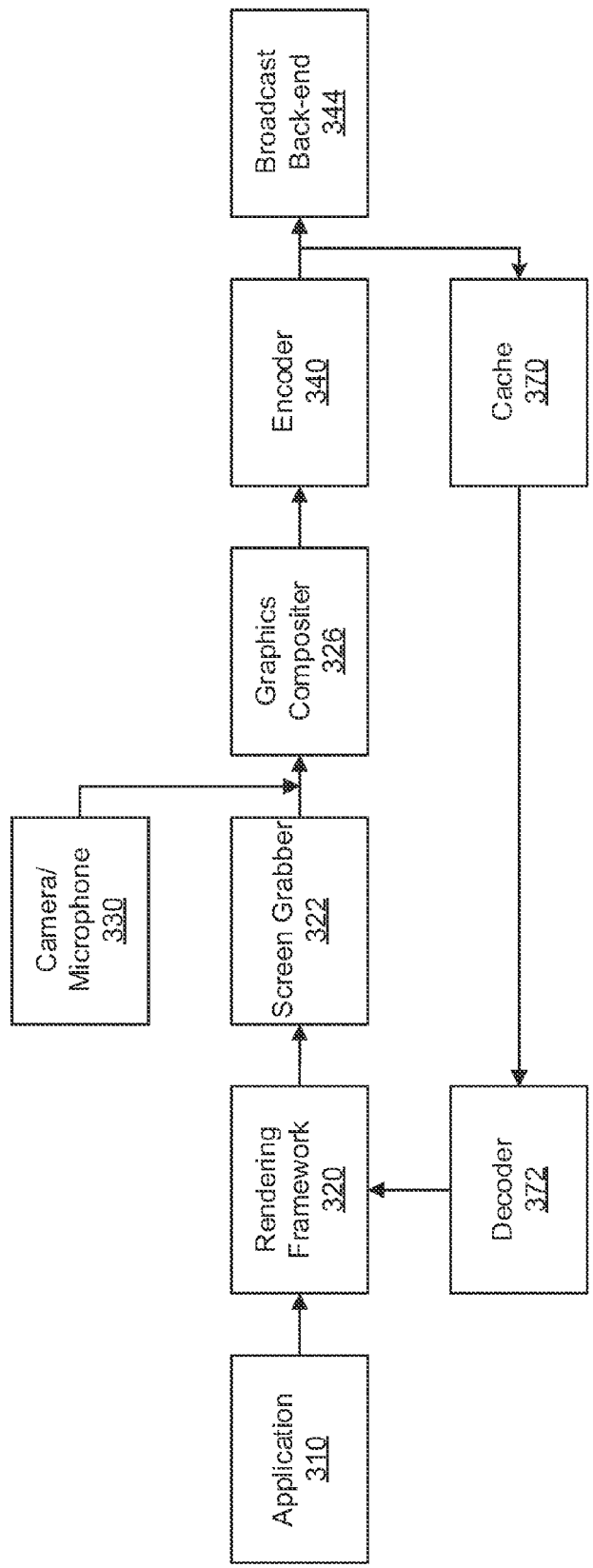
FIGS. 10A and 10B illustrate a system for displaying a replay when broadcasting game content, according to one embodiment of the present invention.
Figure 10B:
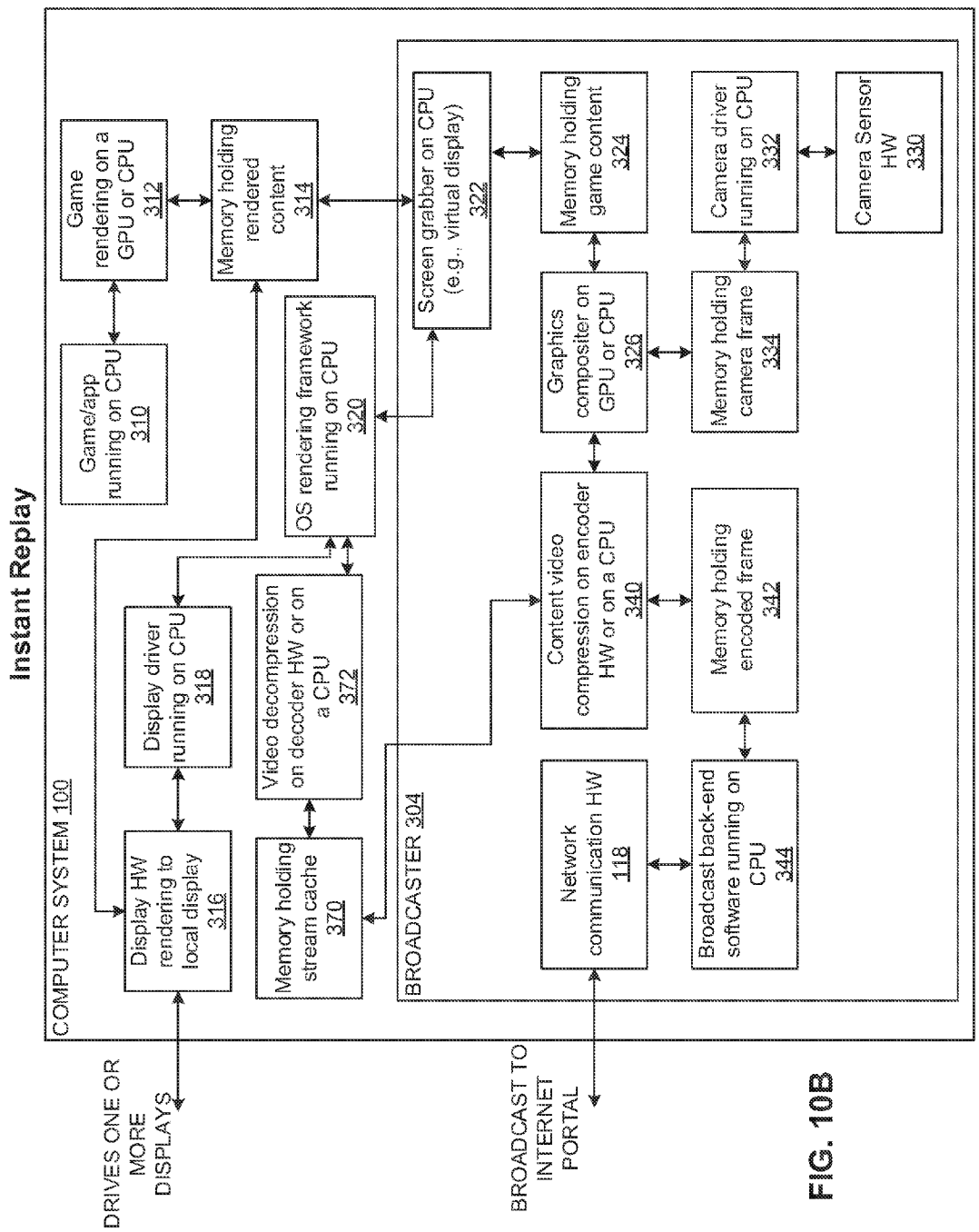

FIGS. 10A and 10B illustrate a system for displaying a replay when broadcasting game content 460, according to one embodiment of the present invention. The technique described below enables a user to quickly and easily broadcast a replay of gameplay. The replay could be for a configurable duration of time. A replay of the specified duration would then be broadcast to the gamecasting server. The replay could be shown to the user on the local display device 110, on an external display device 442 (e.g., using the spectator mode techniques described above), and/or sent only to those viewing the user's gameplay via the gamecast.

As shown in FIG. 10A, after game content 460 (e.g., video content and/or audio content) is encoded, the game content may be stored in a cache 370 (e.g., a memory, such as a buffer). Game content 460 may be recorded and stored in the cache 370 by a background process that records the game content 460. Then, when a user would like to broadcast a replay of the game content 460, the encoded game content 460 is transmitted to a decoder 372, which decodes the encoded game content 460 and transmits the decoded game content 460 to the rendering framework 320. The replayed game content 460 is then broadcast. In other embodiments, an encoder and/or the cache 370 may be positioned to encode game content 460 prior to compositing GUI elements 466 or other GUI materials (e.g., the live video feed). Accordingly, in some embodiments, the technique for broadcasting a replay may be combined with the technique for selectively compositing user interface elements with game content 460 described above. Additionally, in other embodiments, once a replay is initiated, the encoded game content 460 stored in the cache 370 may be transmitted to the broadcast back-end 344 without being replayed for the user (e.g., via the rendering framework 320).

Figure 11:
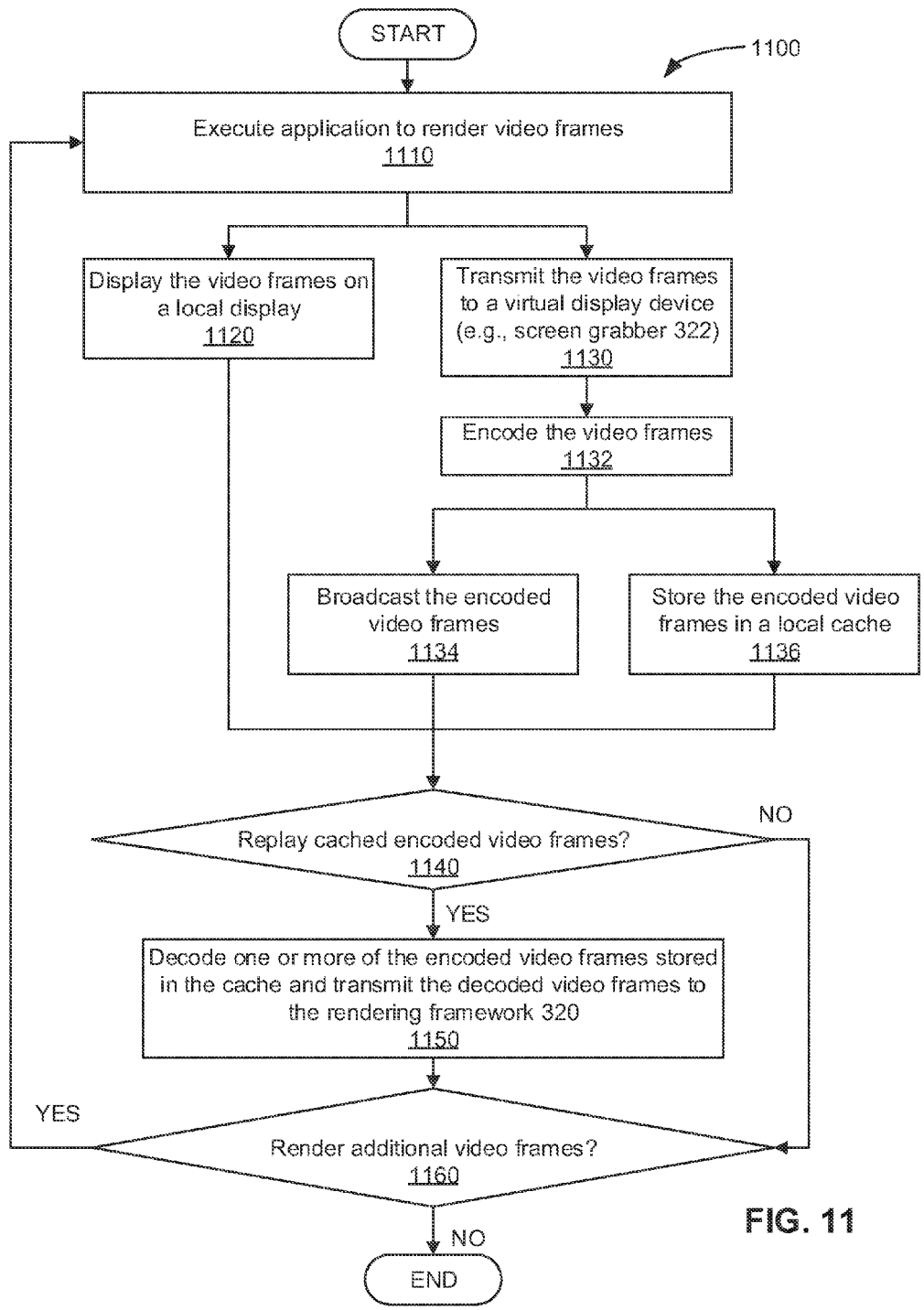
FIG. 11 is a flow diagram of method steps for displaying a replay when broadcasting game content, according to one embodiment of the present invention.

FIG. 11 is a flow diagram of method steps for displaying a replay when broadcasting game content 460, according to one embodiment of the present invention. Although the method steps are described in conjunction with the systems of FIGS. 1A-3, 10A and 10B, persons skilled in the art will understand that any system configured to perform the method steps, in any order, falls within the scope of the present invention.

As shown, a method 1100 begins at step 1110, where the CPU 102 and/or PPU 202 execute an application 310 to render video frames of game content 460. At step 1120, the local display device 110 displays the video frames. At step 1130, the CPU 102 and/or PPU 202 transmit the video frames to the virtual display device 322. At step 1132, the encoder 340 encodes the video frames. At step 1134, the broadcast back-end 344 broadcasts the encoded video frames. At step 1136, the encoded video frames are stored in the cache 370.

Next, at step 1140, if a replay command was received, then, at step 1150, the CPU 102, PPU 202, and/or a hardware decoder decode and transmit one or more of the encoded video frames stored in the cache 370 to the rendering framework 320 (or to the broadcast back-end 344, the broadcast compositer 326, etc.). A replay command may be issued and/or terminated by a button press, a hotkey combo, touchscreen input (e.g., a gesture), and the like. If replay is not active, then the method 1100 proceeds to step 1160, where it is determined whether additional video frames are to be rendered. If additional video frames are to be rendered, then the method 1100 returns to step 1110. If no additional video frames are to be rendered, then the method 1100 ends.

In various embodiments, the technique for broadcasting a replay described above may be combined with any of the other techniques described herein. In some embodiments, the technique may be combined with the low-latency spectator mode technique described above, such that a replay is transmitted to one or more of the external display device 442, the local display device 110, and/or the remote server (e.g., portal 432). In the same or other embodiments, the technique for selectively compositing user interface elements also may be implemented in order to control which GUI elements, if any, are outputted to one or more of the external display device 442, the local display device 110, and/or the remote server during a replay. Additionally, although the above embodiments discuss encoding, caching, decoding, and replaying video frames, the techniques described above may be used for replaying any type of frame (e.g., composited frame, rendered frame, etc.).

In sum, a CPU 102 and/or PPU 202 execute an application to render a video frame of game content 460. The video frame is displayed on the local display device 110 and also transmitted to an external compositer 440. The external compositer 440 composites external display elements (e.g., statistics, chat windows, a live video feed, etc.) with the video frame to generate a first composited frame. The external display device 442 then displays the first composited frame. The video frame may further be transmitted to a broadcast compositer 326, which composites broadcast display elements (e.g., statistics, chat windows, a live video feed, etc.) with the video frame to generate a second composited frame. A broadcaster back-end 344 then broadcasts the second composited frame to a remote server (e.g., a gamecasting server).

One advantage of the disclosed techniques is that they enable a user to view a low-latency version of a gamecast on a local display device. Another advantage of the disclosed techniques is that a user is able to adjust which graphical user interface elements are outputted to a local display, an external display, and/or a remote server during gamecasting. The disclosed techniques further enable the rate(s) at which frames are transmitted to a local display, an external display, and/or a remote server to be monitored and dynamically adjusted during gamecasting. Additionally, the disclosed techniques enable a user to easily initiate a replay of content during gamecasting.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. For example, as described above, any of the gamecasting techniques described above may be performed as standalone techniques, or two or more of the gamecasting techniques may be combined in any practical manner. Accordingly, it is contemplated that various blocks included in the flowcharts and/or block diagrams may be rearranged in embodiments where two or more of the gamecasting techniques are performed together.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., video processing and/or speech analysis applications) or related data available in the cloud.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method comprising:
   executing, on a computer device comprising a first display, an application program to generate video frames of game content;
   causing the video frames to be displayed on the first display at a first frame rate;
   compositing, at the computer device, at least one graphical user interface (GUI) element with the video frames to generate composited frames at a second frame rate;
   causing the composited frames to be displayed on a second display coupled to a display interface of the computer device by transmitting the composited frames to the second display via the display interface of the computer device;
   determining that the first frame rate is less than a threshold frame rate; and
   in response to determining that the first frame rate is less than the threshold frame rate, decreasing the second frame rate.

2. The method of claim 1, wherein the at least one GUI element comprises at least one of a camera feed and a textual communication interface.

3. The method of claim 1, wherein the display interface comprises at least one of a wireless display interface and a wired display interface.

4. The method of claim 1, wherein the application program comprises a video game application executing on a mobile gaming device, and the video frames and the composited frames comprise real-time game content.

5. The method of claim 1, wherein executing the application program to generate the video frames comprises generating rendered frames, and compositing a heads-up display (HUD) with the rendered frames to generate the video frames.

6. The method of claim 1, further comprising:
   encoding the video frames to generate encoded video frames;
   storing the encoded video frames in a memory;
   in response to receiving a replay command, decoding the encoded video frames to generate decoded video frames; and
   causing the decoded video frames to be displayed on at least one of the first display and the second display.

7. The method of claim 1, further comprising:
   determining that the first frame rate is greater than or equal to the threshold frame rate; and
   in response to determining that the first frame rate is greater than or equal to the threshold frame rate, increasing the second frame rate.

8. The method of claim 1, wherein the threshold frame rate is specified by a display driver for the first display.

9. The method of claim 1, wherein the computer device is a mobile device, the first display is a primary display of the mobile device, and the second display is an external display of the mobile device.

10. A system comprising:
    a display interface;
    a processor coupled to the display interface and configured to:
       execute an application program to generate video frames of game content;
       cause the video frames to be displayed on a first display at a first frame rate;
       composite at least one graphical user interface (GUI) element with the video frames to generate composited frames at a second frame rate;

cause the composited frame to be displayed on the external display device by transmitting the composited frame to the external display device via the local display interface; and cause the composited frames to be displayed on a second display coupled to a display interface of the computer device by transmitting the composited frames to the second display via the display interface;

determine that the first frame rate is less than a threshold frame rate; and in response to determining that the first frame rate is less than the threshold frame rate, decreasing the second frame rate; and the first display coupled to the processor and configured to display the video frames.

11. The system of claim 10, further comprising a camera coupled to the processor and configured to capture a video feed, wherein the at least one GUI element comprises the video feed.

12. The system of claim 10, wherein the local display interface comprises at least one of a wireless display interface and a wired display interface.

13. The system of claim 10, wherein the application program comprises a video game application, and the video frames and the composited frames comprise real-time game content.

14. The system of claim 13, wherein the system comprises a hand-held gaming device.

15. The system of claim 10, wherein the processor is configured to execute the application program to generate the video frames by generating rendered frames, and compositing a heads-up display (HUD) with the rendered frames to generate the video frames.

16. The system of claim 10, wherein the processor is further configured to:

encode the video frames to generate encoded video frames;

store the encoded video frames in a memory;

in response to receiving a replay command, decoding the encoded video frames to generate decoded video frames; and cause the decoded video frames to be displayed on at least one of the first display and the second display.

17. A non-transitory computer-readable storage medium including instructions that, when executed by a processing unit, cause the processing unit to perform the steps of:

executing, on a computer device comprising a first display, an application program to generate video frames of game content;

causing the video frames to be displayed on the first display at a first frame rate;

compositing, at the computer device, at least one graphical user interface (GUI) element with the video frames to generate composited frames at a second frame rate;

causing the composited frames to be displayed on a second display coupled to a display interface of the computer device by transmitting the composited frames to the second display via the display interface of the computer device;

determining that the first frame rate is less than a threshold frame rate; and in response to determining that the first frame rate is less than the threshold frame rate, decreasing the second frame rate.

* * * * *

UNITED STATES PATENT AND TRADEMARK OFFICE
CERTIFICATE OF CORRECTION

PATENT NO. : 10,112,115 B2
APPLICATION NO. : 14/526196
DATED : October 30, 2018
INVENTOR(S) : Joshua Abbott et al.

It is certified that error appears in the above-identified patent and that said Letters Patent is hereby corrected as shown below:

In the Claims

Column 17, Claim 12, Line 20, please delete "local" before display.

Signed and Sealed this
Twenty-second Day of January, 2019

Andrei Iancu
*Director of the United States Patent and Trademark Office*